United States Patent
Ishihara et al.

(10) Patent No.: US 9,819,030 B2
(45) Date of Patent: Nov. 14, 2017

(54) PRODUCTION METHOD OF CATALYST INK FOR FUEL CELL, MANUFACTURING METHOD OF CATALYST LAYER FOR FUEL CELL AND MANUFACTURING METHOD OF MEMBRANE ELECTRODE ASSEMBLY FOR FUEL CELL

(71) Applicant: TOYOTA JIDOSHA KABUSHIKI KAISHA, Toyota-shi, Aichi-ken (JP)

(72) Inventors: Noriaki Ishihara, Toyota (JP); Masao Okumura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 231 days.

(21) Appl. No.: 14/779,409

(22) PCT Filed: Jan. 14, 2014

(86) PCT No.: PCT/JP2014/000116
§ 371 (c)(1),
(2) Date: Sep. 23, 2015

(87) PCT Pub. No.: WO2014/155901
PCT Pub. Date: Oct. 2, 2014

(65) Prior Publication Data
US 2016/0056476 A1   Feb. 25, 2016

(30) Foreign Application Priority Data
Mar. 28, 2013  (JP) ................. 2013-067865

(51) Int. Cl.
*H01M 4/88* (2006.01)
*C09D 11/037* (2014.01)
(Continued)

(52) U.S. Cl.
CPC ......... *H01M 4/8828* (2013.01); *C09D 11/037* (2013.01); *C09D 11/10* (2013.01);
(Continued)

(58) Field of Classification Search
CPC .... C09D 11/037; C09D 11/10; H01M 4/8663; H01M 4/8807; H01M 4/8828;
(Continued)

(56) References Cited

U.S. PATENT DOCUMENTS 6,309,772 B1 * 10/2001  Zuber ................. H01M 4/881
                                                         106/122
2001/0024748 A1  9/2001  Mizuno et al.
(Continued)

FOREIGN PATENT DOCUMENTS

JP  2001-266901 A  9/2001
JP  2010-225585 A  10/2010
(Continued)

*Primary Examiner* — Sonya Mazumdar
(74) *Attorney, Agent, or Firm* — Andrews Kurth Kenyon LLP

(57) ABSTRACT

It becomes easy to regulate the storage modulus of the ionomer solution to be not lower than 150 Pa. The production method of catalyst ink for fuel cell includes steps of; (i) preparing a catalyst dispersion by mixing an electrode catalyst, water and an alcohol; (ii) preparing a gelated ionomer solution by mixing an ionomer and a solvent; and (iii) producing catalyst ink by mixing the catalyst dispersion and the gelated ionomer solution, wherein the step (ii) comprises concentration a step of concentrating the gelated ionomer solution.

8 Claims, 5 Drawing Sheets

(51) Int. Cl.
*C09D 11/10* (2014.01)
*H01M 4/86* (2006.01)
*C09D 11/033* (2014.01)
*H01M 8/1004* (2016.01)

(52) U.S. Cl.
CPC ........... *H01M 4/8663* (2013.01); *H01M 4/88* (2013.01); *H01M 4/8882* (2013.01); *H01M 4/8807* (2013.01); *H01M 8/1004* (2013.01); *Y02P 70/56* (2015.11)

(58) Field of Classification Search
CPC .... H01M 4/8882; H01M 8/1004; H01M 4/88; Y02P 70/56
See application file for complete search history.

(56) References Cited

U.S. PATENT DOCUMENTS

| 2002/0037449 | A1* | 3/2002 | Binder | H01M 4/881 |
| | | | | 429/483 |
| 2009/0208806 | A1* | 8/2009 | Izuhara | C08G 65/4056 |
| | | | | 429/450 |
| 2014/0205932 | A1 | 7/2014 | Hori et al. | |

FOREIGN PATENT DOCUMENTS

| JP | 2010-257929 A | 11/2010 |
| JP | 2011-159517 A | 8/2011 |
| JP | 2012-212523 A | 11/2012 |
| JP | 5880562 B2 | 3/2016 |
| WO | 2013/031060 A1 | 3/2013 |

* cited by examiner

PRODUCTION METHOD OF CATALYST INK FOR FUEL CELL, MANUFACTURING METHOD OF CATALYST LAYER FOR FUEL CELL AND MANUFACTURING METHOD OF MEMBRANE ELECTRODE ASSEMBLY FOR FUEL CELL

CROSS-REFERENCE TO RELATED APPLICATIONS

This is a national phase application based on the PCT International Patent Application No. PCT/JP2014/000116 filed Jan. 14, 2014, claiming priority to Japanese Patent Application No. 2013-067865 filed Mar. 28, 2013, the entire contents of both of which are incorporated herein by reference.

TECHNICAL FIELD

The present invention relates to a production method of catalyst ink for fuel cell, a manufacturing method of a catalyst layer for fuel cell and a manufacturing method of a membrane electrode assembly for fuel cell.

BACKGROUND ART

A known production method of a catalyst ink for fuel cell includes steps of (a) mixing an electrode catalyst with water and a lower alcohol (having 4 or less carbon atoms) and dispersing electrode catalyst particles to prepare a dispersion, (b) mixing an ionomer with a solvent to prepare an ionomer solution having relative permittivity of not less than 30 at 20° C., (c) mixing the dispersion prepared in the step (a) with the ionomer solution prepared in the step (b) to obtain a fluid dispersion, and (d) mixing the fluid dispersion obtained in the step (c) with a low relative-permittivity dispersion medium having relative permittivity of not larger than 20 at 20° C., so as to increase the viscosity of the fluid dispersion.

CITATION LIST

Patent Literature

[PTL1] JP2010-257929 A

SUMMARY OF INVENTION

Technical Problem

Unless the high-viscosity ionomer solution is used in the above method, a catalyst layer manufactured by using the resulting catalyst ink is more likely to be cracked. The larger ion exchange equivalent is desirable, on the other hand, in terms of the power generation efficiency of the fuel cell and the cell life. When the ion exchange equivalent (EW value) is not lower than 900 g/mol, there is a difficulty in increasing the viscosity of the ionomer solution (more specifically, regulating the storage modulus of the ionomer solution to be not lower than 150 Pa).

Solution to Problem

In order to achieve at least part of the foregoing, the present invention provides various aspects described below.

(1) According to one aspect of the invention, there is provided production method of catalyst ink for fuel cell. The production method of catalyst ink for fuel cell comprises steps of: (i) preparing a catalyst dispersion by mixing an electrode catalyst, water and an alcohol; (ii) preparing a gelated ionomer solution by mixing an ionomer and a solvent; and (iii) producing catalyst ink by mixing the catalyst dispersion and the gelated ionomer solution, wherein the step (ii) comprises a concentration step of concentrating the gelated ionomer solution. The production method of the catalyst ink for fuel cell according to this aspect concentrates the gelated ionomer solution to vaporize and thereby decrease water which is the component of the large solubility parameter (SP value) included in the ionomer, simultaneously with the solvent. This decreases the SP value of the solvent content of the gelated ionomer solution and adjusts the storage modulus of the gelated ionomer solution to be not lower than 150 Pa more easily than a method of regulating another condition.

(2) The production method of catalyst ink for fuel cell according to the aspect before, wherein the gelated ionomer solution in the step (ii) includes a solid content and a solvent content, and the concentration step may comprise a step of regulating a solubility parameter (SP value) of the solvent content to be not higher than 12.3. The production method of the catalyst ink for fuel cell according to this aspect regulates the SP value of the solvent content of the gelated ionomer solution to be not larger than 12.3 even when the ionomer has the ion exchange equivalent (EW value) of not lower than 900 g/mol. This adjusts the storage modulus of the gelated ionomer solution to be not lower than 150 Pa more easily than a method of regulating another condition.

(3) The production method of catalyst ink for fuel cell according to the aspect before, wherein the concentration step may comprise concentration step of concentrating the gelated ionomer solution to increase percent by mass of the ionomer to 40 to 50%. The production method of the catalyst ink for fuel cell according to this aspect includes the concentration step to increase the percent by mass of the ionomer to 40 to 50%. This vaporizes and decreases water having the large SP value, simultaneously with the solvent.

(4) The production method of catalyst ink for fuel cell according to the aspect before, further may comprise a step of: after the concentration step, adding an alcohol to regulate percent by mass of a solid content in the gelated ionomer solution between 17.5 wt % and 25 wt %, inclusive. The production method of the catalyst ink for fuel cell according to this aspect facilitates the storage modulus of the gelated ionomer solution to be adjusted to be not lower than 150 Pa.

(5) The production method of catalyst ink for fuel cell according to the aspect before, further may comprise a step of: after the concentration step, adding an alcohol to regulate percent by mass of a solid content in the gelated ionomer solution between 20 wt % and 25 wt %, inclusive. The production method of the catalyst ink for fuel cell according to this aspect facilitates the storage modulus of the gelated ionomer solution to be adjusted to be not lower than 150 Pa even when there is a variation in EW value of the ionomer or the like.

(6) The production method of catalyst ink for fuel cell according to the aspect before, further may comprise a step of: keeping the gelated ionomer solution at temperature of 70° C. to 90° C. for at least 4 hours. The production method of the catalyst ink for fuel cell according to this aspect facilitates the storage modulus of the gelated ionomer solution to be adjusted to be not lower than 150 Pa.

(7) The production method of catalyst ink for fuel cell according to the aspect before, wherein retention time to keep the gelated ionomer solution at the temperature of 70°

C. to 90° C. may be at least 5 hours. The production method of the catalyst ink for fuel cell according to this aspect facilitates the storage modulus of the gelated ionomer solution to be adjusted to be not lower than 150 Pa even when there is a variation in EW value of the ionomer or the like.

The invention may be implemented by a variety of aspects other than the production method of the catalyst ink for fuel cell, for example, a manufacturing method of a catalyst layer for fuel cell, a manufacturing method of a membrane electrode assembly for fuel cell and a manufacturing method of a fuel cell.

DESCRIPTION OF EMBODIMENT

Figure 1:
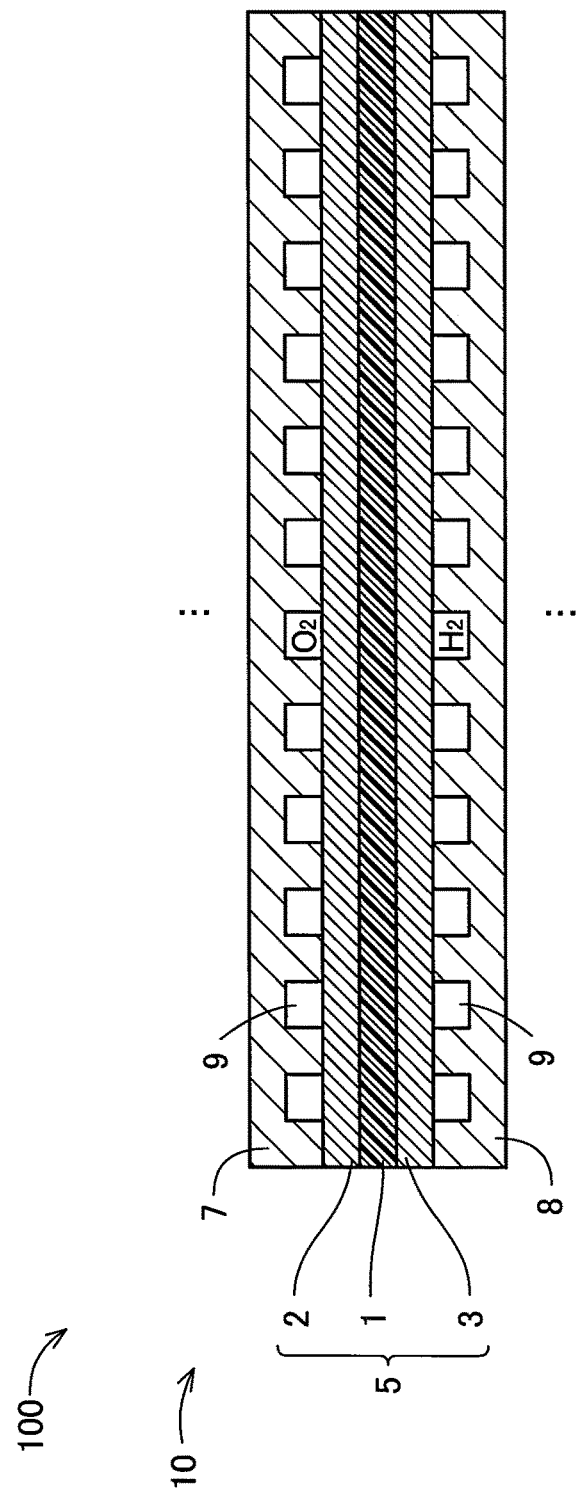
FIG. 1 is a schematic diagram illustrating one example of the configuration of a fuel cell according to one embodiment of the invention.

FIG. 1 is a schematic diagram illustrating one example of the configuration of a fuel cell according to one embodiment of the invention. This fuel cell 100 is a polymer electrolyte fuel cell that receives supplies of hydrogen and oxygen as reactive gases to generate electricity. The fuel cell 100 includes a plurality of unit cells 10. The plurality of unit cells 10 are stacked to form the stack structure.

The unit cell 10 includes a membrane electrode assembly 5 and a first separator 7 and a second separator 8 that are arranged such that the membrane electrode assembly 5 is placed therebetween. Each unit cell 10 also has seal members to prevent leakage of fluids and manifolds provided to supply the reactive gases to the membrane electrode assembly 5, although their illustration and description are omitted.

The membrane electrode assembly 5 is a power generation element that includes an electrolyte membrane 1, a first electrode catalyst layer 2 and a second electrode catalyst layer 3. The electrolyte membrane 1 is configured by a thin film of a polymer having ion conductivity (hereinafter called "ionomer") and has good proton conductivity in the wet state. The electrolyte membrane 1 may be configured by, for example, a fluororesin-based ion exchange membrane. More specifically, the electrolyte membrane 1 is made of a perfluorosulfonic acid polymer having —$SO_3H$ group at a side chain terminal, such as Nafion (registered trademark).

The first electrode catalyst layer 2 and the second electrode catalyst layer 3 are placed on the respective surfaces of the electrolyte membrane 1. The first electrode catalyst layer 2 and the second electrode catalyst layer 3 are catalyst electrodes with a catalyst (for example, platinum (Pt)) for accelerating the fuel cell reactions supported thereon and has gas permeability and gas diffusibility. During operation of the fuel cell 100, the first electrode catalyst layer 2 receives supply of oxygen to serve as a cathode, while the second electrode catalyst layer 3 receives supply of hydrogen to serve as an anode.

The first electrode catalyst layer 2 and the second electrode catalyst layer 3 are formed by applying and drying catalyst ink. The catalyst ink is prepared by dispersing an ionomer and catalyst-supported particles, which are obtained by making the catalyst supported on conductive particles, in a hydrophilic solvent. The ionomer may be an identical ionomer or an analogous ionomer with the ionomer included in the electrolyte membrane 1. The catalyst ink used for forming the first electrode catalyst layer 2 and the second electrode catalyst layer 3 of this embodiment will be described later in detail, associated with a manufacturing process of the membrane electrode assembly 5.

Gas diffusion layers may be provided outside of the first electrode catalyst layer 2 and outside of the second electrode catalyst layer 3 to diffuse the respective reactive gases over the respective electrode surfaces. The gas diffusion layers may be made of a porous fibrous base material having electrical conductivity, gas permeability and gas diffusibility, such as carbon fiber or graphite fiber, or a metal plate processed to be porous, such as foamed metal or expanded metal.

The first separator 7 is placed outside of the first electrode catalyst layer 2 of the membrane electrode assembly 5, and the second separator 8 is placed outside of the second electrode catalyst layer 3. The first separator 7 and the second separator 8 are formed from gas-impermeable plate-like members having electrical conductivity (for example, metal plates). Each of the first separator 7 and the second separator 8 has flow path grooves 9 formed over the entire power generation area on its membrane electrode assembly 5-side surface for the flow of the reactive gas (oxygen or hydrogen). The flow path grooves 9 may, however, be omitted.

Figure 2:
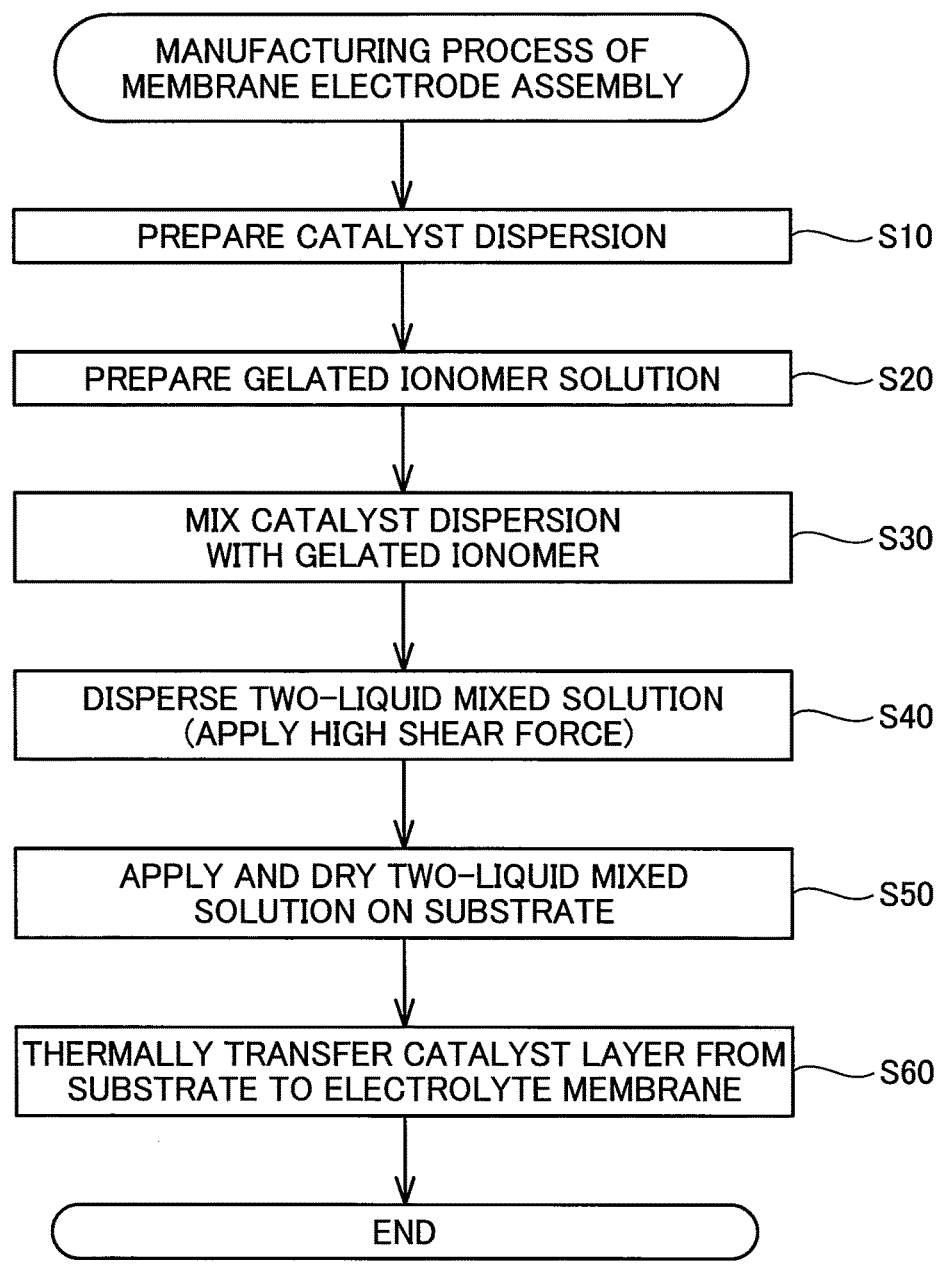
FIG. 2 is a flowchart showing a procedure of a manufacturing process of the membrane electrode assembly.

FIG. 2 is a flowchart showing a procedure of a manufacturing process of the membrane electrode assembly 5. At step S10, a catalyst dispersion is prepared.

Figure 3:
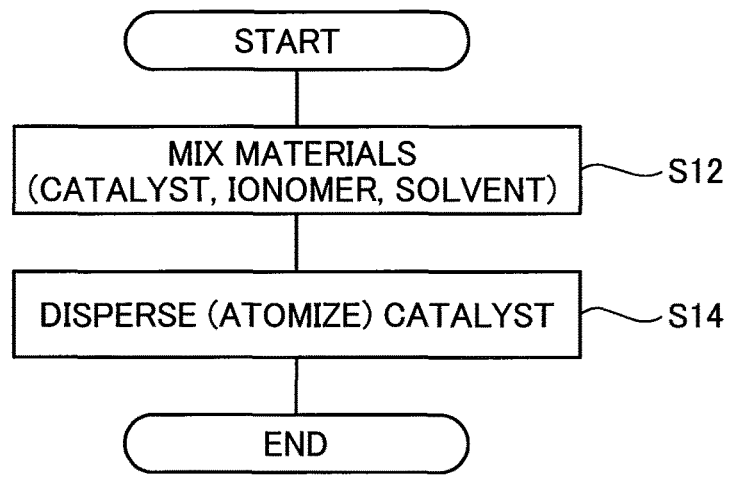
FIG. 3 is a diagram illustrating the step of preparing the catalyst dispersion (step S10).

FIG. 3 is a diagram illustrating the step of preparing the catalyst dispersion (step S10). Step 10 is comprised of two steps S12 and S14. At step S12, materials of the catalyst dispersion are mixed. More specifically, ion exchanged water is added to carbon with a catalyst metal supported thereon. The catalyst metal employed may be, for example, platinum or an alloy of platinum and another metal. In the description below, carbon with the catalyst metal supported thereon is called "catalyst-supported particles", and ion exchanged water is called "water". Premixing the catalyst-supported particles with water to make the catalyst-supported particles soaked in water suppresses ignition in the subsequent process of adding a solvent like alcohol such as ethanol or 1-propanol. A hydrophilic solvent (hereinafter simply called "solvent") such as ethanol or 1-propanol is added subsequently. An ionomer is further added. The ionomer serves as a surface active agent for accelerating dispersion of the catalyst-supported particles. An ionomer solution may be added to the aqueous dispersion of the catalyst-supported particles, prior to addition of the hydrophilic solvent.

At step S14, the mixture of the catalyst-supported particles, water, the solvent and the ionomer is dispersed with ultrasonic wave or with a bead mill. This causes the mixture of the catalyst-supported particles, water, the solvent and the ionomer to be atomized and homogeneously dispersed.

At step S20 in FIG. 2, a gelated ionomer solution is prepared.

Figure 4:
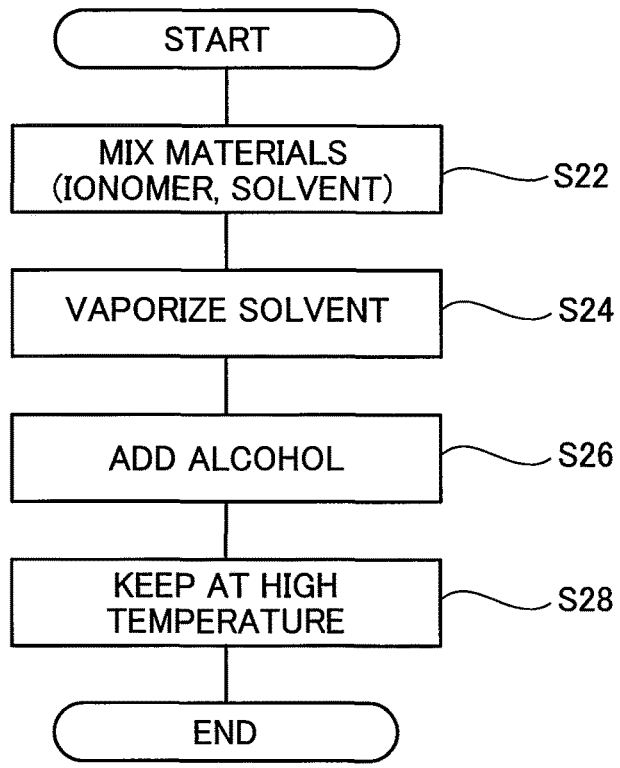
FIG. 4 is a diagram illustrating the step of preparing the gelated ionomer solution (step S20).

FIG. 4 is a diagram illustrating the step of preparing the gelated ionomer solution (step S20). Step S20 is comprised of four steps S22, S24, S26 and S28. At step S22, an ionomer and a solvent like alcohol (for example, mixed solvent of ethanol and 1-propanol) are mixed with stirring. At step S24, the mixed solution of the ionomer and the solvent is concentrated by vaporization of the solvent to increase the percent by mass of the ionomer to 40-50 wt %. At step S26, an alcohol or the like is added, in order to decrease the percent by mass of the solid content in the resulting gelated ionomer solution. At step S28, the gelated ionomer solution is heated to 70-90° C. and is kept at this temperature for a predetermined time period.

According to this embodiment, adding the alcohol at step S26 after the concentration by vaporization of the solvent at step S24 is attributed to the following reason. The ionomer includes water. According to a literature, water has an SP value of as large as 23.4 at 25° C. The SP value denotes the solubility parameter. An SP value δ in the standard conditions (25° C., 1 atm) is defined as:

$$\delta = \sqrt{((\Delta H - RT)/V)}$$

where ΔH represents molar enthalpy of vaporization in the standard conditions, R represents gas constant, T represents absolute temperature (25° C.=293.15 K), and V represents molar volume in the standard conditions. According to this embodiment, it is desirable to set the SP value of the solvent content of the gelated ionomer solution to be not higher than 12.3 as described later. The effect of water having the large SP value, however, makes it difficult to decrease the SP value of the solvent content of the gelated ionomer solution. Accordingly the procedure of this embodiment mixes water with an alcohol or the like, decreases both water and the alcohol from the solvent content of the gelated ionomer solution, and subsequently adds an alcohol or the like, so as to decrease the SP value of the solvent content of the gelated ionomer solution.

At step S30 in FIG. 3, the gelated ionomer solution is mixed with the catalyst dispersion with lightly stirring. The mixed solution of the catalyst dispersion and the gelated ionomer solution is called two-liquid mixed solution. At step S40, a high shear force is applied to the two-liquid mixed solution, so as to disperse the two-liquid mixed solution and produce catalyst ink.

At step S50, a catalyst layer is formed by applying and drying the catalyst ink produced by the process up to step S40 on a substrate. At step S60, the catalyst layer is thermally transferred from the substrate to each surface of the electrolyte membrane 1, so that the first electrode catalyst layer 2 and the second electrode catalyst layer 3 are formed and the membrane electrode assembly 5 is obtained.

EXAMPLES

<Step S10: Preparation of Catalyst Dispersion>

A catalyst dispersion was prepared using carbon particles with a catalyst made of a platinum-cobalt alloy supported thereon (catalyst-supported particles) by adding a mass of ion exchanged water about 1 to 5 times the mass of the catalyst-supported particles, further adding a mass of ethanol about 3 to 5 times the mass of the catalyst-supported particles and 10 to 20 wt % of SS900C/10 manufactured by Asahi Kasei Corp. as the ionomer relative to the mass of the catalyst-supported particles and sufficiently stirring the mixture.

<Step S20: Preparation of Gelated Ionomer Solution>

SS900C/10 manufactured by Asahi Kasei Corp. was used as the ionomer. Ethanol and 1-propanol (hereinafter referred to as "alcohol or the like") was added as the solvent to the ionomer with stirring. The solvent was vaporized to increase the percent by mass of SS900C/10 to 40 to 50 wt %, and subsequently alcohol or the like was added. Water included in the ionomer is also vaporized during vaporization of the solvent. The temperature of vaporizing the solvent may not be necessarily the azeotropic temperature of the alcohol and water.

<Step S30: Mixing Catalyst Dispersion with Gelated Ionomer Solution with Stirring>

The gelated ionomer solution was mixed with the catalyst dispersion. The amount of the gelated ionomer solution to be added to the catalyst dispersion is preferably 50 to 70 wt % as the percent by mass relative to the mass of the catalyst-supported particles. A stirring blade in a helical shape was then rotated at the rotation speed in a range of 50 to 200 rpm, so as to stir the mixture for 1 or 2 hours and apply a low shear force to the mixture.

<Step S40: Dispersion of Two-Liquid Mixed Solution>

Catalyst ink was obtained by applying a high shear force to the two-liquid mixed solution at the peripheral speed of 10 m/s for about 5 minutes using FILMIX Model 56-50 manufactured by PRIMIX Corporation.

<Step S50: Production of Catalyst Layer>

Each catalyst ink obtained by the above process was applied on a Teflon (registered trademark) film substrate using a doctor blade applicator and was heated and dried at 100° C., so that a catalyst layer was produced.

<Step S60: Transfer of Catalyst Layer to Electrolyte Membrane>

The above catalyst layer was transferred from the film substrate onto respective surfaces of a thin film made of Nafion 112 by hot pressing at 130° C.

<Evaluation>

Figure 5:
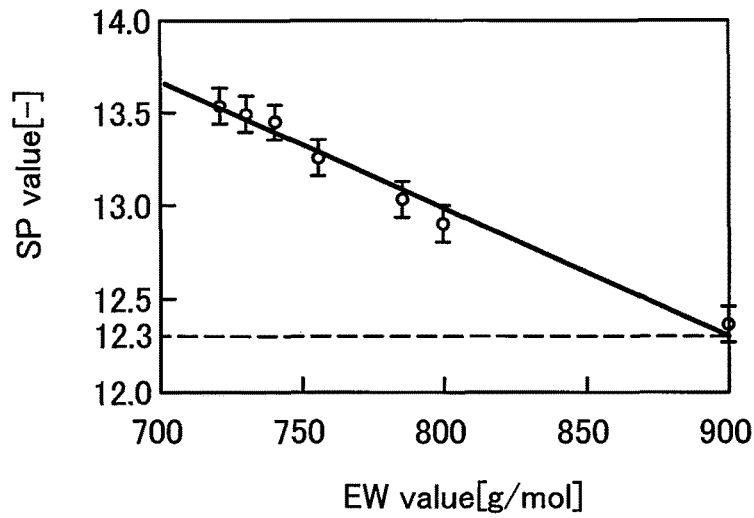
FIG. 5 is a graph showing a relationship between EW value of the ionomer and SP value of the solvent content of the gelated ionomer solution when the storage modulus of the gelated ionomer solution is not lower than 150 Pa.

FIG. 5 is a graph showing a relationship between EW value of the ionomer and SP value of the solvent content of the gelated ionomer solution when the storage modulus of the gelated ionomer solution is not lower than 150 Pa. The EW value denotes ion-exchange equivalent and shows the dried mass of the ionomer per 1 mol of ion-exchange group (sulfonate group in this embodiment). The larger EW value indicates the less number of sulfonate groups per unit mass of the ionomer. When catalyst ink prepared from the ionomer having the small EW value is used to form the catalyst electrode, this is more likely to reduce the mobility of water content in the catalyst electrode and deteriorate the power generation performance. The ionomer having the small EW value is likely to be dissolved in hot water (for example, water of 80° C. or higher), so that the catalyst electrode formed using catalyst ink prepared from the ionomer having the small EW method is likely to have the lower durability against the high-temperature and high-humidity environment such as inside of the fuel cell during operation. Accordingly, it is preferable to use the ionomer having the large EW value. Using the ionomer having the EW value of larger than 900 g/mol, on the other hand, leads to a problem that makes it difficult to thicken the gelated ionomer solution.

Any material has the viscoelasticity (property that exhibits both viscous and elastic characteristics). The elasticity is defined by the stress-strain relationship such as Hooke's law, and the viscosity is defined by the stress-strain rate relationship such as Newton's viscosity law. The corresponding parameter of the viscoelasticity is complex modulus. The viscoelasticity is defined by the response of stress when a strain in a sinusoidal waveform is input into a viscoelastic body. The complex modulus is expressed by a complex number, in which its real part is called storage modulus and its imaginary part is called loss modulus.

According to this embodiment, the storage modulus of the gelated ionomer solution was obtained by applying vibration at a frequency of 1 Hz and measuring the value at a strain of 1% using a dynamic viscoelasticity measuring instrument manufactured by Anton Paar. PP25 manufactured by Anton Paar as used as a plate for the dynamic viscoelasticity measuring instrument manufactured by Anton Paar.

According to this embodiment, the criterion of the storage modulus is set to 150 Pa, because of the following reason. When catalyst ink is prepared using the gelated ionomer solution having the storage modulus of lower than 150 Pa, the catalyst ink is more likely to have insufficient coating strength in the process of applying the catalyst ink and lead to deterioration of the resulting catalyst electrode.

According to this embodiment, the SP value of the solvent content of the gelated ionomer solution is adjustable by regulating the type of the solvent added to the ionomer and the mixing ratio. In the standard conditions (25° C., 1 atm), for example, the SP value of ethanol is 12.92, and the SP value of 1-propanol is 11.97. Accordingly, the SP value of the solvent is adjustable by changing the mixing ratio of ethanol and 1-propanol. As described above, the ionomer includes water (SP value of 23.4). It is accordingly preferable to calculate the amounts of ethanol and 1-propanol to be added to control the SP value to be not larger than 12.3 by taking into account the amount of water in the solvent content of the gelated ionomer solution. The SP value of the solvent content of the gelated ionomer solution may be obtained by quantitatively analyzing the content rates of ethanol, 1-propanol and water in the solvent content of the gelated ionomer solution by gas chromatography and calculating a weighted average using theoretical SP values.

As understood from FIG. 5, there is a significant relationship between the EW value and the SP value required for controlling the storage modulus to be not lower than 150 Pa. At the large EW value of 900 g/mol, the SP value of not larger than 12.3 provides the storage modulus of not lower than 150 Pa. Ethanol has the SP value of 12.92, which is larger than 12.3, while 1-propanol has the SP value of 11.97, which is smaller than 12.3. Accordingly, the SP value of the solvent content of the gelated ionomer solution is adjustable to be not larger than 12.3 by decreasing the ratio of ethanol and increasing the ratio of 1-propanol as the amounts of the alcohols to be added. At the EW value of larger than 900 g/mol, a target SP value may be smaller than 12.3.

Figure 6:
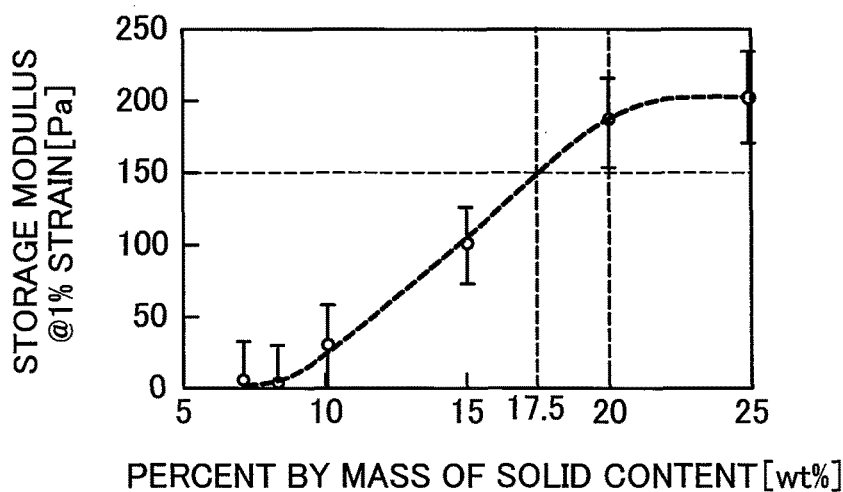
FIG. 6 is a diagram showing the relationship between the percent by mass of the solid content in the gelated ionomer solution and the storage modulus when the ionomer having the EW value of 900 is used and the solvent content of the gelated ionomer solution has the SP value of 12.3.

FIG. 6 is a diagram showing the relationship between the percent by mass of the solid content in the gelated ionomer solution and the storage modulus when the ionomer having the EW value of 900 is used and the solvent content of the gelated ionomer solution has the SP value of 12.3. As understood from FIG. 6, the percent by mass of the solid content in the gelated ionomer solution of not lower than 17.5 wt % provides the storage modulus of not lower than 150 Pa as the average value. By taking into account a variation, the percent by mass of the solid content in the gelated ionomer solution of not lower than 20 wt % provides the storage modulus of not lower than 150 Pa. Increasing the percent by mass of the solid content in the gelated ionomer solution to be higher than 25 wt % is, however, unlikely to increase the storage modulus to be higher than about 200 Pa. Accordingly, the percent by mass of the solid content in the gelated ionomer solution is preferably 17.5 wt % to 25 wt % and is more preferably 20 wt % to 25 wt %. The percent by mass of the solid content in the gelated ionomer solution may, however, be higher than 25 wt %.

Figure 7:
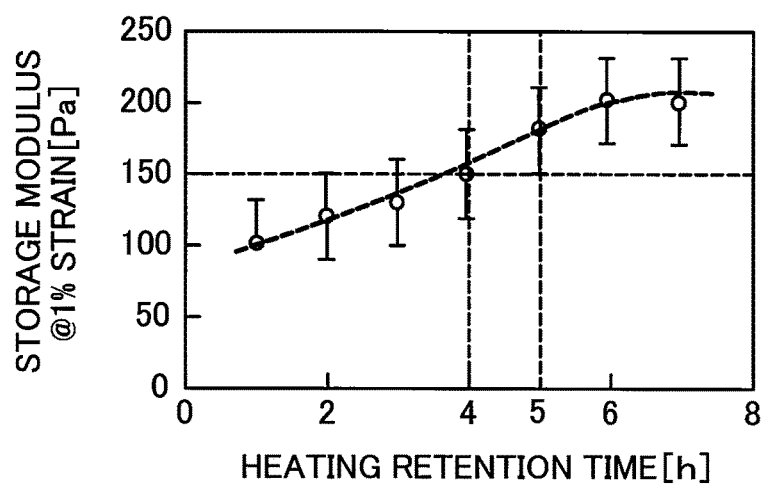
FIG. 7 is a diagram showing the relationship between the heating retention time and the storage modulus when the ionomer having the EW value of 900 is used, the solvent content of the gelated ionomer solution has the SP value of 12.3 and the percent by mass of the solid content in the gelated ionomer solution is 20 wt %.

FIG. 7 is a diagram showing the relationship between the heating retention time and the storage modulus when the ionomer having the EW value of 900 is used, the solvent content of the gelated ionomer solution has the SP value of 12.3 and the percent by mass of the solid content in the gelated ionomer solution is 20 wt %. As understood from FIG. 7, the heating retention time of not less than 4 hours provides the storage modulus of not lower than 150 Pa as the average value. By taking into account a variation, the heating retention time of not less than 5 hours provides the storage modulus of not lower than 150 Pa. Increasing the heating retention time to be not less than 6 to 7 hours is, however, unlikely to increase the storage modulus to be higher than about 200 Pa. The shorter heating retention time is advantageous in terms of the manufacturing cost. Accordingly, the heating retention time is preferably 4 hours to 7 hours and is more preferably 5 hours to 6 hours.

As described above, according to this embodiment, the gelated ionomer solution is prepared such that its solvent content has the SP value of 12.3. This adjusts the storage modulus of the gelated ionomer solution to be not lower than 150 Pa even when the ionomer has the EW value of 900 g/mol.

According to this embodiment, the storage modulus of the gelated ionomer solution is adjustable to be not lower than 150 Pa by using the ionomer having the EW value of 900, setting the SP value of the solvent content of the gelated ionomer solution to 12.3 and regulating the percent by mass of the solid content in the gelated ionomer solution to be 17.5 wt % to 25 wt %. The percent by mass of the solid content in the gelated ionomer solution is more preferably 20 wt % to 25 wt %. This adjusts the storage modulus of the gelated ionomer solution to be not lower than 150 Pa even when there is a variation in EW value of the ionomer.

According to this embodiment, the storage modulus of the gelated ionomer solution is adjustable to be not lower than 150 Pa by using the ionomer having the EW value of 900, setting the SP value of the solvent content of the gelated ionomer solution to 12.3, regulating the percent by mass of the solid content in the gelated ionomer solution to 20 wt %, and setting the heating retention time to 4 to 7 hours. The heating retention time of the gelated ionomer solution is more preferably 5 hours to 6 hours. This adjusts the storage modulus of the gelated ionomer solution to be not lower than 150 Pa even when there is a variation in EW value of the ionomer.

The SP value of the solvent content of the gelated ionomer solution is 12.3 according to the above embodiment, but is not necessarily limited to 12.3. After the ionomer is mixed with the solvent, the gelated ionomer solution may be concentrated, so as to decrease the content of water having the large SP value in the ionomer. This decreases the SP value of the solvent content of the gelated ionomer solution. This results in adjusting the storage modulus of the gelated ionomer solution to be not lower than 150 Pa more easily than a method of regulating another parameter.

The foregoing describes some aspects of the invention with reference to some embodiments and examples. The embodiments and the examples of the invention described above are provided only for the purpose of facilitating the understanding of the invention and not for the purpose of limiting the invention in any sense. The invention may be changed, modified and altered without departing from the scope of the invention and includes equivalents thereof.

REFERENCE SIGNS LIST

1 . . . electrolyte membrane
2 . . . first electrode catalyst layer
3 . . . second electrode catalyst layer
5 . . . membrane electrode assembly
7 . . . first separator
8 . . . second separator
9 . . . flow path groove
10 . . . unit cell
100 . . . fuel cell
112 . . . Nafion

The invention claimed is:

1. A production method of catalyst ink for fuel cell, comprising steps of:
   (i) preparing a catalyst dispersion by mixing an electrode catalyst, water and an alcohol;
   (ii) preparing a gelated ionomer solution by mixing an ionomer and a solvent; and
   (iii) producing catalyst ink by mixing the catalyst dispersion and the gelated ionomer solution, wherein
   the gelated ionomer solution in the step (ii) includes a solid content and a solvent content; and
   the step (ii) comprises concentration a step of concentrating the gelated ionomer solution,
   wherein the concentration step comprises a step of regulating a solubility parameter (SP value) of the solvent content to be not higher than 12.3.

2. The production method of the catalyst ink for fuel cell according to claim 1,
   wherein the concentration step comprises a step of concentrating the gelated ionomer solution to increase percent by mass of the ionomer to 40 to 50%.

3. The production method of the catalyst ink for fuel cell according to claim 1, further comprising a step of:
   after the concentration step, adding an alcohol to the gelated ionomer solution to regulate percent by mass of a solid content in the gelated ionomer solution between 17.5 wt % and 25 wt %, inclusive.

4. The production method of the catalyst ink for fuel cell according to claim 1, further comprising a step of:
   after the concentration step, adding an alcohol to the gelated ionomer solution to regulate percent by mass of a solid content in the gelated ionomer solution between 20 wt % and 25 wt %, inclusive.

5. The production method of the catalyst ink for fuel cell according to claim 3, the step (ii) further comprising a step of:
   keeping the gelated ionomer solution at temperature of 70° C. to 90° C. for at least 4 hours.

6. The production method of the catalyst ink for fuel cell according to claim 5,
   wherein retention time to keep the gelated ionomer solution at the temperature of 70° C. to 90° C. is at least 5 hours.

7. A manufacturing method of a catalyst layer for fuel cell, comprising a steps of:
   applying the catalyst ink for fuel cell produced by the production method according to claim 1, on a substrate; and
   heating and drying the catalyst ink.

8. A manufacturing method of a membrane electrode assembly for fuel cell, comprising a step of:
   transferring the catalyst layer for fuel cell manufactured by the manufacturing method according to claim 7 from the substrate to an electrolyte membrane by hot pressing at temperature of 130° C.

* * * * *